US012750210B2

(12) United States Patent
Kaufmann

(10) Patent No.: US 12,750,210 B2
(45) Date of Patent: Sep. 29, 2026

(54) SYSTEMS AND METHODS FOR EXTENDING CRYPTOGRAPHIC CERTIFICATES WITH TARGET-BINDING INFORMATION

(71) Applicant: ASSA ABLOY AB, Stockholm (SE)

(72) Inventor: Martin Kaufmann, Graz (AT)

(73) Assignee: ASSA ABLOY AB, Stockholm (SE)

(*) Notice: Subject to any disclaimer, the term of this patent is extended or adjusted under 35 U.S.C. 154(b) by 0 days.

(21) Appl. No.: 18/869,533

(22) PCT Filed: Nov. 4, 2022

(86) PCT No.: PCT/EP2022/080803
§ 371 (c)(1),
(2) Date: Nov. 26, 2024

(87) PCT Pub. No.: WO2024/094309
PCT Pub. Date: May 10, 2024

(65) Prior Publication Data
US 2025/0310087 A1 Oct. 2, 2025

(51) Int. Cl.
*H04L 9/08* (2006.01)
*H04L 9/32* (2006.01)

(52) U.S. Cl.
CPC .......... *H04L 9/0825* (2013.01); *H04L 9/3247* (2013.01); *H04L 9/3268* (2013.01)

(58) Field of Classification Search
CPC ... H04L 9/0825; H04L 9/3247; H04L 9/3268; H04L 9/321; H04L 9/3263; H04L 63/105; H04L 63/0823
See application file for complete search history.

(56) References Cited

U.S. PATENT DOCUMENTS 9,332,002 B1 * 5/2016 Bowen ................ H04L 63/0823
2005/0262553 A1 * 11/2005 Bialick .................. G06F 21/10 726/10

(Continued)

FOREIGN PATENT DOCUMENTS

| | | |
|---|---|---|
| CN | 111241519 | 6/2020 |
| WO | 0054127 | 9/2000 |
| WO | 2024094309 | 5/2024 |

OTHER PUBLICATIONS

"International Application Serial No. PCT EP2022 080803, International Search Report mailed Jul. 3, 2023", 4 pgs.

(Continued)

*Primary Examiner* — Henry Tsang
(74) *Attorney, Agent, or Firm* — Schwegman Lundberg & Woessner, P.A.

(57) ABSTRACT

A first computing device maintains multiple resource-specific asymmetric keypairs that are each uniquely associated with a different protected resource on the first device, including a first resource-specific asymmetric keypair that is uniquely associated with a first protected resource. The first device engages with a second device in an authentication flow based on the first resource-specific asymmetric keypair. The first device receives, from the second device, a public-key certificate that contains target-binding data that indicates a specified asymmetric keypair. The first device checks whether the specified asymmetric keypair matches the first resource-specific asymmetric keypair. If so, and assuming any other authentication conditions are also met, the first device authenticates the second device to the first resource-specific asymmetric keypair, and grants the second device access to the first protected resource.

21 Claims, 7 Drawing Sheets

(56) References Cited

U.S. PATENT DOCUMENTS

| | | | | |
|---|---|---|---|---|
| 2013/0268755 | A1* | 10/2013 | Simmons | G06F 21/10 713/156 |
| 2017/0300708 | A1* | 10/2017 | Gopshtein | H04L 63/0823 |
| 2021/0135872 | A1* | 5/2021 | Laffey | H04L 9/0897 |

OTHER PUBLICATIONS

"International Application Serial No. PCT EP2022 080803, Written Opinion mailed Jul. 3, 2023", 5 pgs.

* cited by examiner

SYSTEMS AND METHODS FOR EXTENDING CRYPTOGRAPHIC CERTIFICATES WITH TARGET-BINDING INFORMATION

CROSS-REFERENCE TO RELATED APPLICATION

This application is a national stage application under 35 U.S.C. § 371 of PCT Appl. No. PCT/EP2022/080803, titled "SYSTEMS AND METHODS FOR EXTENDING CRYPTOGRAPHIC CERTIFICATES WITH TARGET-BINDING INFORMATION," filed Nov. 4, 2022, which is incorporated herein by reference in its entirety.

TECHNICAL FIELD

Among other technical fields, embodiments of the present disclosure pertain to security, authentication, encryption, asymmetric encryption, public-key cryptography, public-key certificates, separation of access conditions, and, more particularly, to systems and methods for extending cryptographic certificates with target-binding information.

BACKGROUND

Data encryption is used for many purposes in today's modern society. One prominent purpose for which data encryption is used is authentication. Generally speaking, authentication is the process by which a person or device establishes (or at least tries to establish) that they actually are the person or device that they represent themselves to be. Communication exchanges related to authentication are often referred to as authentication flows, and include one-way authentication flows and mutual authentication flows. Moreover, various types of encryption exist, including what are known as symmetric encryption and asymmetric encryption.

In a type of asymmetric encryption known as public-key cryptography, devices typically generate or are provisioned with an asymmetric keypair that includes a public key and a secret key that are mathematically related to one another such that neither the public key nor its corresponding secret key can be derived from the other, and such that a message that is encrypted with one of the two keys can (realistically) only be decrypted using the other of the two keys.

Devices often exchange public keys with one another, while keeping their secret keys private. As stated, communication that is encrypted with a given public key can only be decrypted using the corresponding secret key, and vice versa. As such, a communication (e.g., a message, a document, etc.) that is signed using a given secret key can only have that signature verified using the corresponding public key. As such, public-key cryptography can be used both for encryption of underlying communications and for authentication via signature verification. In some cases, public-key cryptography is used at least in part to establish a symmetric key that both parties to a given communication session can then use to encrypt substantive communications.

Returning to the context of authentication, one commonly used tool for authentication is known as a public-key certificate, which is an electronic document that includes an identity of a given entity (e.g., person, system, entity, organization, etc.) as well as a public key of that entity. Thus, a public-key certificate is an electronic document that "binds" a given public key to an identity of the owner of that public key. A public-key certificate is cryptographically signed by an organization known as a "trusted authority" (or "certification authority"), and includes data that identifies the particular trusted authority that signed the particular public-key certificate.

A trusted authority uses the trusted authority's own secret key to cryptographically sign a given public-key certificate. Other devices can therefore use the trusted authority's corresponding public key to verify that the certificate was indeed cryptographically signed by that trusted authority, and accordingly trust that the public key provided in the certificate actually belongs to the entity that is identified in the certificate as being the owner of that public key. The trusted authority, together with its secret key and corresponding public key, may be thought of as the "trust root" of a given public-key certificate.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
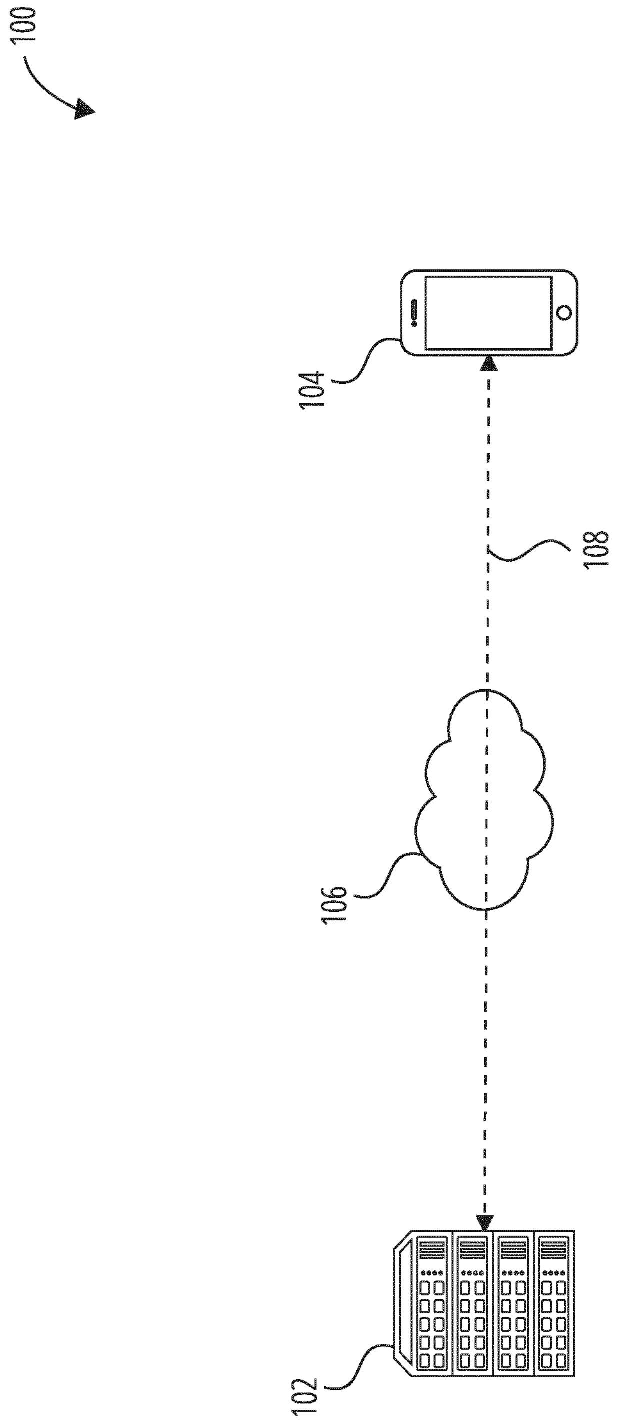
FIG. 1 depicts an example communication arrangement, in accordance with at least one embodiment.

It is often the case that a given individual, organization, and/or the like wishes to implement differential access to certain resources on a given device, system, or the like. For ease of explanation and illustration though not by way of limitation, a smartphone is used here as an example device on which differential access to resources may be implemented. It is noted that differential access may also be referred to using phrases such as "separation of access conditions" and the like.

The multiple resources to which differential access is desired to be implemented could take a number of different forms. One example set of resources is different data locations (e.g., data containers) on the example smartphone. Another example set of resources is different sets of privileges (e.g., permissions, user-level access vs. admin-level access, read access vs. write access with respect to one or more data values and/or settings, etc.). Still another example is access to different installed applications. Many other sets of resources to which differential access could be implemented on the example smartphone (or other device or system) could be listed here as well.

Generally speaking, and regardless of the specific type of resources, one way that differential access to different resources can be implemented is by associating a different respective asymmetric keypair on the smartphone with each different resource. In such implementations, in order to access a given protected resource, a corresponding device or system would have to engage in a successful authentication flow (a.k.a. "authentication process," etc.) with respect to the specific asymmetric keypair that is associated with the given protected resource—i.e., the resource-specific asymmetric keypair.

This approach has drawbacks. For one, to attain the desired level of security (i.e., separation of access conditions for the relevant resources), this approach relies on a correct configuration being performed on the smartphone at the time of provisioning, personalization, customization, reconfiguration, and/or the like. In this context, a correct configuration involves each different resource-specific asymmetric keypair, each of which is associated with—effectively "guarding"—a different protected resource, being associated with a different trusted-authority public key. In the present disclosure, trusted-authority public keys are also referred to as "root keys," "trusted-authority root keys." and the like. Moreover, as stated above, trusted authorities are also referred to in the art as "certification authorities."

Even if done correctly, the above-described configuration is administratively burdensome in that the smartphone must store and manage a different trusted-authority root key for each and every resource-protecting asymmetric keypair. This can be a storage-capacity problem, and instead or in addition can be a key-management headache. Moreover, there are inevitably times where this configuration is not done correctly. In such an example, two or more different resources—that are supposed to have independent access conditions—could mistakenly each be associated with the same trusted-authority root key. Indeed, there is no limit to the number of protected resources whose corresponding asymmetric keypairs could be associated with the same trusted-authority root key. In such a situation, a public-key certificate that is signed by the corresponding trusted authority could be used to access any one or more of those two or more protected resources. This is clearly a security problem in that the separate resources would not have separate access conditions as was intended.

To address at least the above-described issues with some prior implementations, disclosed herein are embodiments of systems and methods for extending cryptographic certificates with target-binding information. In accordance with at least one embodiment, in a context in which, for example, the above-described example smartphone has two different resources respectively protected by two different asymmetric keypairs, the public-key certificates used by one or more other computing devices or systems each contain target-binding data that limits the applicability of the given certificate to a specified asymmetric keypair on the smartphone. As a first example, the target-binding data could take the form of an identifier that is uniquely associated on the smartphone with the correct asymmetric keypair. As a second example, the target-binding data could take the form of or at least include an absolute path to a storage location of the correct asymmetric keypair on the smartphone (or other device or system, etc., as again, the smartphone is used here by way of example).

Furthermore, in at least one embodiment, part of the authentication flow involves the smartphone verifying that the asymmetric keypair that is specified in a given certificate is the same asymmetric keypair on the smartphone that is involved in that particular authentication process. If there is a match, a proper authentication can be completed (assuming any other necessary aspects of the authentication flow are also met). If there is not a match, however, authentication may fail. Moreover, embodiments of the present disclosure can be implemented in either a one-way authentication flow or a mutual authentication flow.

Embodiments of the present disclosure have a number of advantages over prior implementations. One such advantage is obviating any need to use a different trusted-authority root key for authentication with respect to each different resource-specific asymmetric keypair on the smartphone (or other device, system, etc.). Due to the fact that, in at least one embodiment, each public-key certificate is target-bound to a particular resource-specific asymmetric keypair on the smartphone, the same trusted-authority root key could be used in connection with authentication for more than one resource-specific asymmetric keypair. Indeed, in some embodiments, the same trusted-authority root key is used in connection with authentication for every resource-specific asymmetric keypair on the smartphone or other device. This reduces the above-described root-key storage and management burdens, and solves the above-described dependence on correct configuration and vulnerability to incorrect configuration.

One embodiment takes the form of a method that is performed by a first computing device (e.g., a smartphone) executing instructions on at least one hardware processor. In the method, the first computing device maintains, in data storage, a first plurality of resource-specific asymmetric keypairs that are each uniquely associated with a different protected resource from among a second plurality of protected resources on the first computing device. A first resource-specific asymmetric keypair from among the first plurality is uniquely associated with a first protected resource from among the second plurality. The first computing device engages with a second computing device in a first authentication flow based on the first resource-specific asymmetric keypair. The first computing device receives, from the second computing device as part of the first authentication flow, a first public-key certificate that contains first target-binding data that indicates a first specified asymmetric keypair. The first computing device checks whether the first specified asymmetric keypair matches the first resource-specific asymmetric keypair. The first computing device successfully authenticates the second computing device to the first resource-specific asymmetric keypair in response to each of one or more authentication conditions being met in connection with the first authentication flow. The one or more authentication conditions includes the first specified asymmetric keypair matching the first resource-specific asymmetric keypair.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

FIG. 1 depicts an example communication arrangement 100, in accordance with at least one embodiment. The communication arrangement 100 is presented by way of example and not limitation, as different configurations, devices, arrangements, and/or the like could be present in various different contexts. As can be seen in FIG. 1, a server 102 communicates over a network 106, via a communication link 108, with a mobile device 104. In some embodiments, the network 106 is not present; for example, the server 102 and the mobile device 104 could communicate with one another directly over the communication link 108, in which case the communication link 108 may be a local (e.g., Bluetooth) connection. If present, the network 106 could be or include any combination of one or more wired networks and/or one or more wireless networks. Furthermore, any suitable type and number of intermediate devices could be present in the network 106 and/or along the communication link 108 more generally; some example intermediate devices include wireless access points, routers, bridges, base stations, and/or the like. Similarly, the communication link 108 could include one or more wireless-communication links (using, e.g., Wi-Fi, Bluetooth, 5G, LTE, and/or the like) and/or one or more wired-communication links (using, e.g., Ethernet, USB, and/or the like).

The server 102 and the mobile device 104 are presented as example devices that may be in communication with one another via the communication link 108 in various different embodiments of the present disclosure. Either or both could take on a number of different forms other than those depicted in FIG. 1. The server 102 could itself be a mobile device (e.g., a smartphone): the mobile device 104, though pictured in FIG. 1 as a smartphone, could instead be an access card containing, e.g., one or more radio-frequency identification (RFID) components for communicating via radio frequency (RF). And while the server 102 could be a networked (and/or local) server, it could instead (or in addition) be or include a reader that could interface with the mobile device 104 as part of, for example, a physical access control system (PACS), an electronic access control system (EACS), and/or one or more other types of systems. Numerous other arrangements may be implemented by those of skill in the art having the benefit of the present disclosure.

In at least one embodiment, and regardless of the exact type of devices used in a given implementation, both the server 102 and the mobile device 104 include the hardware, as well as the firmware and/or software, containing the processing resources, storage resources, communication resources, and the like for carrying out at least the herein-described operations. Either of both of the server 102 and the mobile device 104 may be or include a computer system such as the computer system 600 that is depicted in and described in connection with FIG. 6. In the parlance of the present disclosure, the mobile device 104 is referred to at times as the "first computing device." while the server 102 is referred to at times as the "second computing device."

Figure 2:
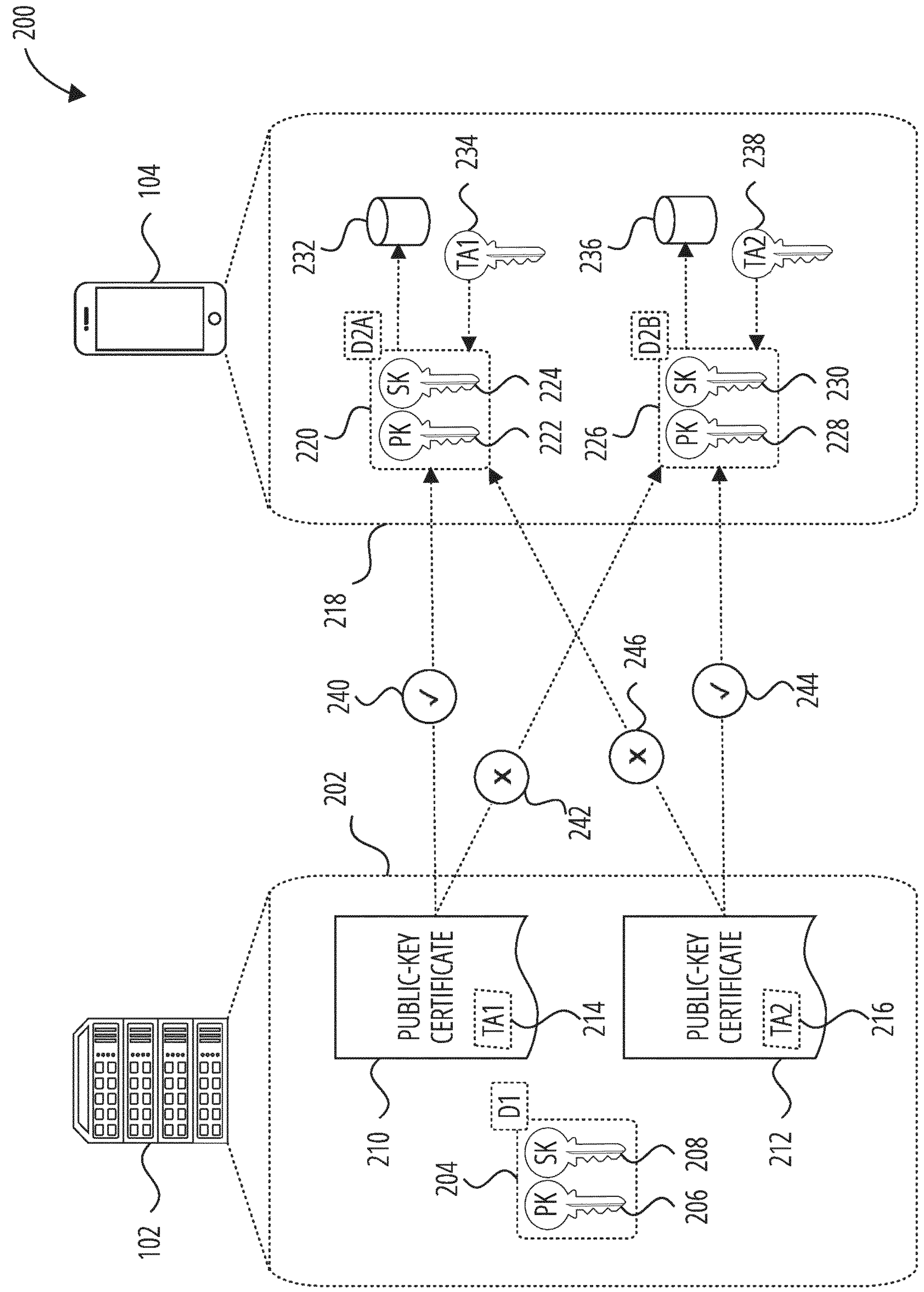
FIG. 2 depicts a first example authentication arrangement.

FIG. 2 depicts an example authentication arrangement 200 between the server 102 and the mobile device 104. The server 102 is depicted in FIG. 2 as having an authentication configuration 202, according to which the server 102 has stored thereon an asymmetric keypair D1 204 that includes a public key 206 and a secret key 208. The server 102 also has stored thereon a public-key certificate 210 and a public-key certificate 212.

In at least one embodiment, the public-key certificate 210 contains (i) an identity (e.g., the name) of the organization (e.g., "102 Incorporated") that operates the server 102, (ii) the public key 206 of 102 Incorporated, and (iii) an identity (e.g., the name) of a first example trusted authority (e.g., "Trust Associates 1"). The public-key certificate 210 also includes a cryptographic signature 214 of the first example trusted authority—i.e., Trust Associates 1.

Like the public-key certificate 210, in at least one embodiment, the public-key certificate 212 includes both (i) the identity ("102 Incorporated") of the organization that operates the server 102 and (ii) the public key 206 of 102 Incorporated. In this example, the public-key certificate 212 also includes (i) an identity (e.g., the name) of a second example trusted authority (e.g., "Trust Anchor 2"). The public-key certificate 212 also includes a cryptographic signature 216 of the second example trusted authority—i.e., Trust Anchor 2.

Furthermore, in FIG. 2, the mobile device 104 is depicted as having an authentication configuration 218, according to which the mobile device 104 has stored thereon an asymmetric keypair D2A 220 that includes a public key 222 and a secret key 224, as well as an asymmetric keypair D2B 226 that includes a public key 228 and a secret key 230. In the depicted example, the asymmetric keypair D2A 220 is a resource-specific asymmetric keypair that is associated with (i.e., guarding, protecting, etc.) a data container 232. Moreover, for authentication purposes, the asymmetric keypair D2A 220 is associated with a root key TA1 234, which is a public key that corresponds to the first example trusted authority—i.e., "Trust Associates 1," which is the trusted authority that signed the public-key certificate 210 with the cryptographic signature 214.

It can also be seen in FIG. 2 that the asymmetric keypair D2B 226 is a resource-specific asymmetric keypair that is associated with (i.e., guarding, protecting, etc.) a data container 236. Additionally, for authentication purposes, the asymmetric keypair D2B 226 is associated with a root key TA2 238, which in this example is a public key that corresponds to the second example trusted authority—i.e., "Trust Anchor 2," which is the trusted authority that signed the public-key certificate 212 with the cryptographic signature 216.

The authentication arrangement 200 represents a configuration in which separation of access conditions for the data container 232 and the data container 236 is achieved by the use of different trusted-authority root keys (i.e., the root key TA1 234 and the root key TA2 238) for authentication purposes for the two different resources. The proper separation of access conditions is represented in FIG. 2 by a checkmark 240, an X mark 242, a checkmark 244, and an X mark 246:

The checkmark 240 indicates that the public-key certificate 210 can be used for authentication with respect to the asymmetric keypair D2A 220 in that the cryptographic signature 214 was generated with a secret key held by the first example trusted authority. "Trust Associates 1," whose corresponding public key is the root key TA1 234.

The X mark 242 indicates that the public-key certificate 210 cannot be used for authentication with respect to the asymmetric keypair D2B 226 in that the cryptographic signature 214 was generated with the secret key held by the first example trusted authority. "Trust Associates 1," whereas the asymmetric keypair D2B 226 is associated for authentication purposes with the root key TA2 238 of the second example trusted authority, "Trust Anchor 2."

The checkmark 244 indicates that the public-key certificate 212 can be used for authentication with respect to the asymmetric keypair D2B 226 in that the cryptographic signature 216 was generated with a secret key held by the second example trusted authority, "Trust Anchor 2," whose corresponding public key is the root key TA2 238.

The X mark 246 indicates that the public-key certificate 212 cannot be used for authentication with respect to the asymmetric keypair D2A 220 in that the cryptographic signature 216 was generated with the secret key held by the second example trusted authority, "Trust Anchor 2," whereas the asymmetric keypair D2A 220 is associated for authentication purposes with the root key TA1 234 of the first example trusted authority, "Trust Associates 1."

Figure 3:
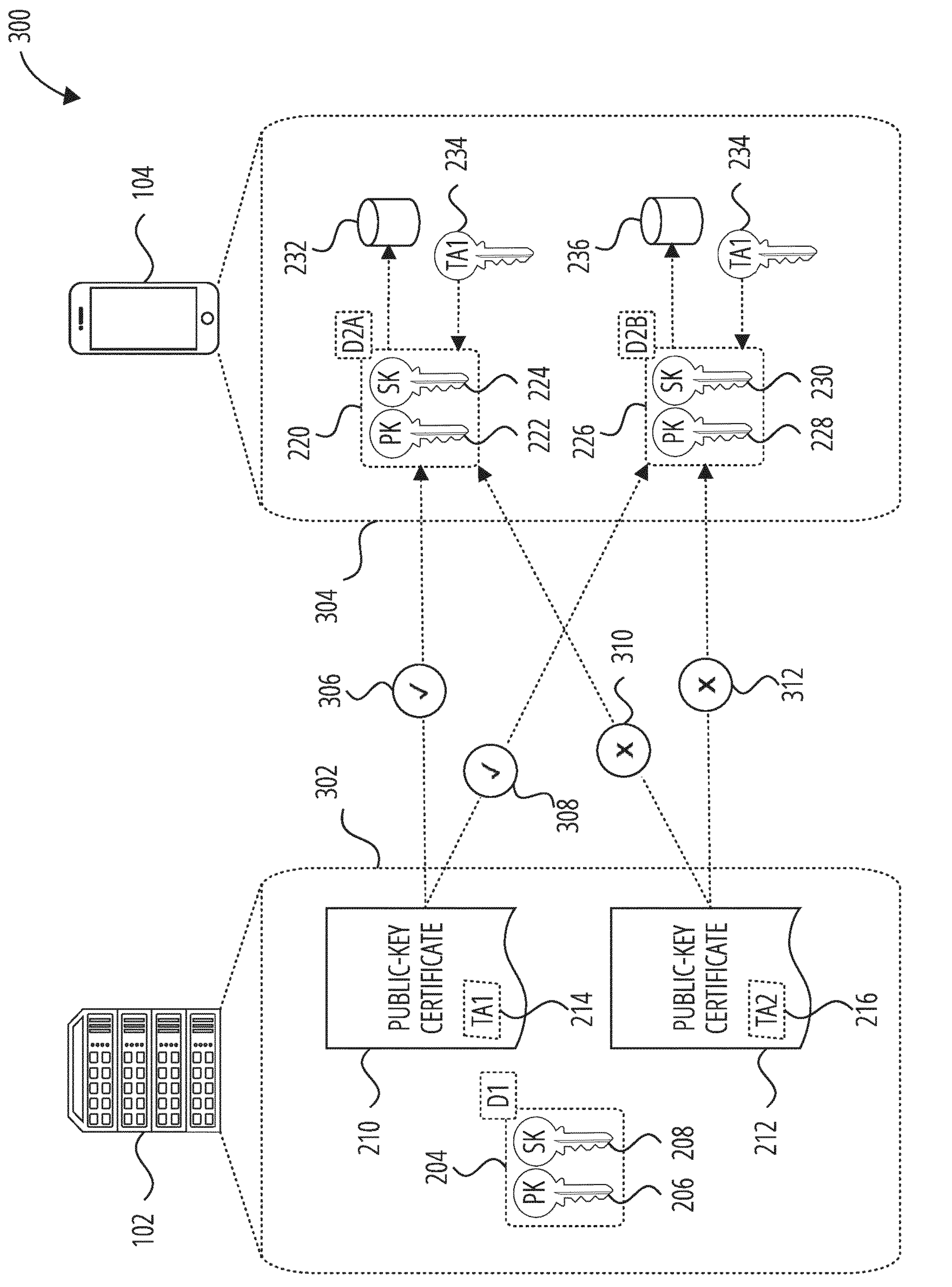
FIG. 3 depicts a second example authentication arrangement.
Figure 4:
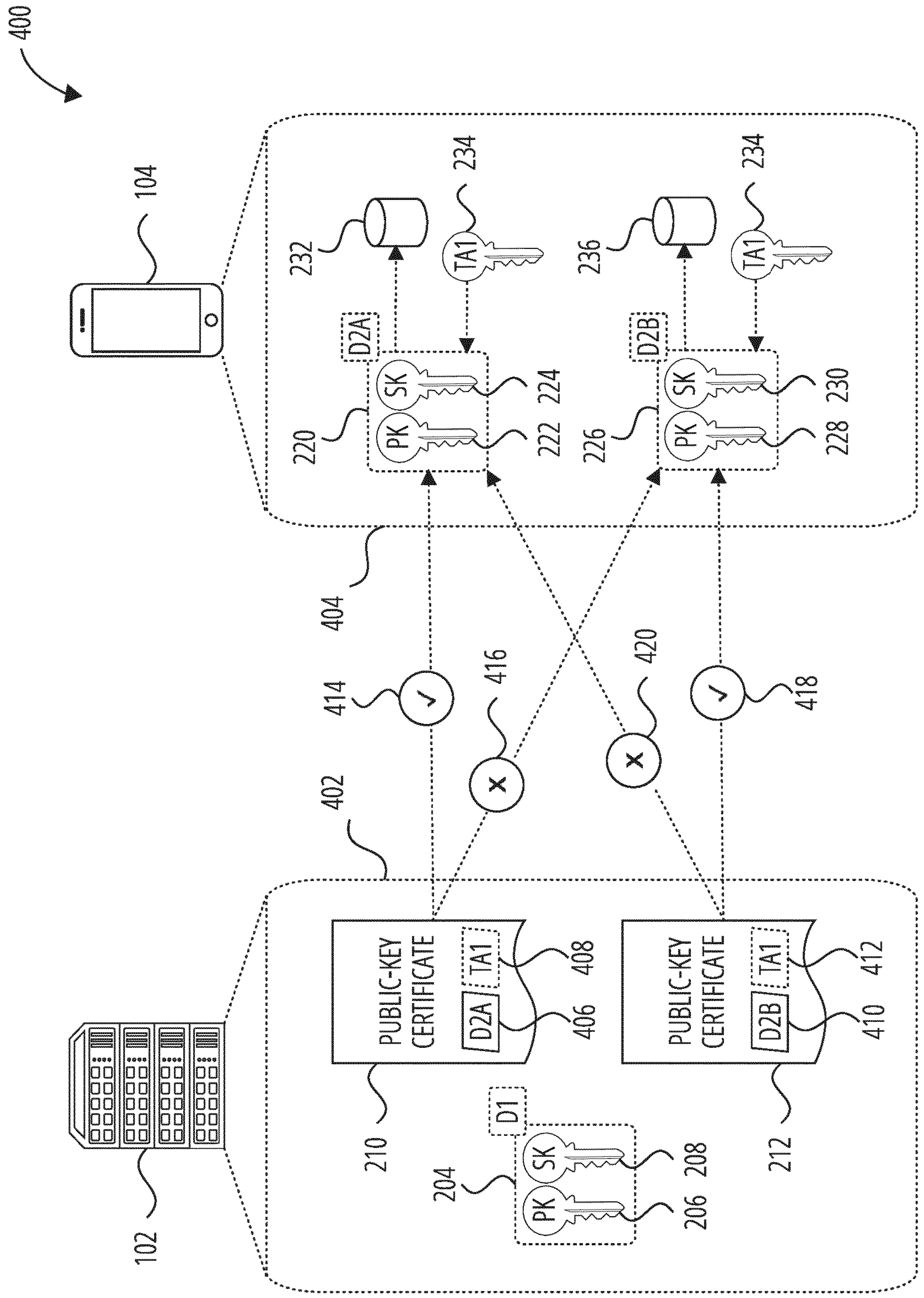
FIG. 4 depicts a third example authentication arrangement, in accordance with at least one embodiment.

It is noted that the checkmarks and the X marks in FIG. 3 and FIG. 4 carry similar meaning to the detailed explanations given above with respect to FIG. 2. As such, those checkmarks and X marks are not explained in such detail. It is further noted here that, although data container 232 and data container 236 are used as the example resources in this depiction, that is by way of example and not limitation. The two protected resources could be of any of the other types mentioned herein, or of any type of resource deemed suitable for protection by those of skill in the art having the benefit of the present disclosure. Moreover, in any given embodiment, two or more protected resources could be of different types.

FIG. 3 depicts an authentication arrangement 300 that is similar in many respects to the example authentication arrangement 200 of FIG. 2, and thus is not described here in as great of detail. Indeed, it can see that many of the elements from FIG. 2 are also present in FIG. 3, and in fact have the same reference numbers in FIG. 3 that they do in FIG. 2. Unlike FIG. 2, however, FIG. 3 depicts a configuration in which separation of access conditions for the data container 232 and the data container 236 has not been achieved. While the server 102 in FIG. 3 has an authentication configuration 302 that matches the authentication configuration 202 that the server 102 has in FIG. 2, there is at least one difference between the authentication configuration 304 that the mobile device 104 has in FIG. 3 as compared with the authentication configuration 218 that the mobile device 104 has in FIG. 2.

Indeed, unlike in FIG. 2, it can be seen in FIG. 3 that both the asymmetric keypair D2A 220 and the asymmetric keypair D2B 226 are associated for authentication purposes with the same trusted-authority root key—i.e., the root key TA1 234. As indicated by the checkmark 306, the checkmark 308, the X mark 310, and the X mark 312, the authentication arrangement 300 of FIG. 3 is such that the public-key certificate 210 can be used for authentication with both the asymmetric keypair D2A 220 and the asymmetric keypair D2B 226, whereas the public-key certificate 212 cannot be used for authentication with either the asymmetric keypair D2A 220 or the asymmetric keypair D2B 226. As described above, this could present a security problem on the mobile device 104.

FIG. 4 depicts an example authentication arrangement 400, in accordance with at least one embodiment. It can be seen in FIG. 4 that the server 102 has an authentication configuration 402 that is similar in many ways to the authentication configuration 202 of FIG. 2 (which is the same as the authentication configuration 302 of FIG. 3 with respect to the depicted elements), but differs in that the public-key certificate 210 further includes D2A target-binding data 406, and the public-key certificate 212 further includes D2B target-binding data 410. In at least one embodiment, the D2A target-binding data 406 specifically identifies the asymmetric keypair D2A 220, whereas the D2B target-binding data 410 specifically identifies the asymmetric keypair D2B 226. Various ways in which target-binding data can specify a particular asymmetric keypair are described herein.

Moreover, because the public-key certificate 210 has different content in FIG. 4 than it does in FIG. 2 and FIG. 3, a different cryptographic signature 408 has been applied by, in this example, the first example trusted authority, "Trust Associates 1." Similarly, because the public-key certificate 212 has different content in FIG. 4 than it does in FIG. 2 and FIG. 3, a different cryptographic signature 412 has been applied to the public-key certificate 212 in FIG. 4.

It is also noted that the cryptographic signature 412 was applied to the public-key certificate 212 by the same trusted authority that applied the cryptographic signature 408 to the public-key certificate 210—i.e., the first example trusted authority, "Trust Associates 1." Accordingly, in the authentication configuration 404 that is shown for the mobile device 104 in FIG. 4, both the asymmetric keypair D2A 220 and the asymmetric keypair D2B 226 are associated for authentication purposes with the same trusted-authority root key TA1 234. This is not a problem in the authentication arrangement 400 of FIG. 4 because (i) the public-key certificate 210 is bound to the asymmetric keypair D2A 220 by the D2A target-binding data 406 and (ii) the public-key certificate 212 is bound to the asymmetric keypair D2B 226 by the D2B target-binding data 410.

As part of the authentication flow between the server 102 and the mobile device 104 with respect to the asymmetric keypair D2A 220, the mobile device 104 verifies that the public-key certificate 210 specifies the asymmetric keypair D2A 220. If it does, authentication can proceed. If it does not, authentication fails. The same is true of an authentication flow between the server 102 and the mobile device 104 with respect to the asymmetric keypair D2B 226. In that case, the mobile device 104 verifies that the public-key certificate 212 specifies the asymmetric keypair D2B 226. If it does, authentication can proceed. If it does not, authentication fails. These results are graphically shown in FIG. 4 with the checkmark 414, the X mark 416, the checkmark 418, and the X mark 420.

Figure 5:
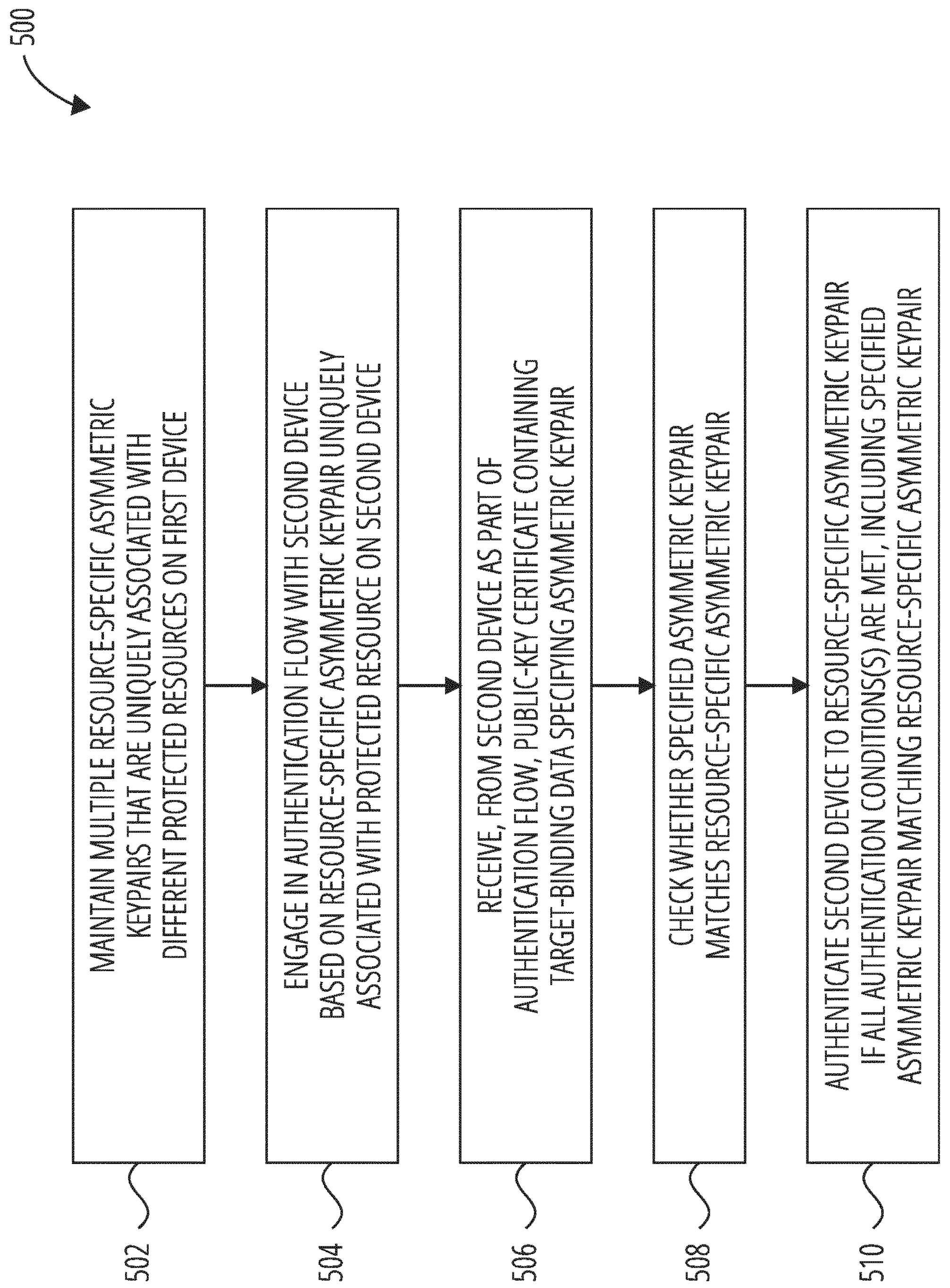
FIG. 5 depicts an example method, in accordance with at least one embodiment.

FIG. 5 depicts an example method 500, in accordance with at least one embodiment. The method 500 is described by way of example as being performed by the mobile device 104, though this is for illustration and not by way of limitation. The method 500 could be performed by any computing device or combination of devices that is suitably programmed to perform the described functions. Example elements are provided in parentheses throughout the below description of the method 500.

At operation 502, the mobile device 104 maintains, in data storage, a first plurality of resource-specific asymmetric keypairs (the asymmetric keypair D2A 220 and the asymmetric keypair D2B 226) that are each uniquely associated with a different protected resource from among a second plurality of protected resources (the data container 232 and the data container 236) on the mobile device 104. A first resource-specific asymmetric keypair (the asymmetric keypair D2A 220) from among the first plurality is uniquely associated with a first protected resource (the data container 232) from among the second plurality.

At operation 504, the mobile device 104 engages with a second computing device (the server 102) in a first authentication flow based on the first resource-specific asymmetric keypair (the asymmetric keypair D2A 220).

At operation 506, the mobile device 104 receives, from the second computing device (the server 102) as part of the first authentication flow, a first public-key certificate (the public-key certificate 210) that contains first target-binding data (the D2A target-binding data 406) that indicates a first specified asymmetric keypair (the asymmetric keypair D2A 220). The mobile device 104 may verify the cryptographic signature 408 of the public-key certificate 210 using the root key TA1 234.

As stated, the D2A target-binding data 406 could specify the asymmetric keypair D2A 220 using a unique identifier or an absolute storage path on the mobile device 104, among other examples. In the case of a unique identifier, the mobile device 104 may still make an explicit selection of the asymmetric keypair D2A 220 upon receiving that identifier. In the case of a storage path, the mobile device 104 may not need to make an explicit selection of the asymmetric keypair D2A 220. Indeed, this may be referred to as implicit selection of the asymmetric keypair D2A 220, saving the mobile device 104 a step in the authentication flow.

At operation 508, the mobile device 104 checks whether the first specified asymmetric keypair (the asymmetric keypair D2A 220) matches the first resource-specific asymmetric keypair (also the asymmetric keypair D2A 220).

At operation 510, the mobile device 104 successfully authenticates the second computing device (the mobile device 104) to the first resource-specific asymmetric keypair (the asymmetric keypair D2A 220) in response to each of one or more authentication conditions being met in connection with the first authentication flow, where the one or more authentication conditions includes the first specified asymmetric keypair (the asymmetric keypair D2A 220) matching the first resource-specific asymmetric keypair (the asymmetric keypair D2A 220). The mobile device 104 may then grant the server 102 access to the first protected resource (the data container 232).

Moreover, as stated above, embodiments of the present disclosure may also be carried out in the other direction—i.e., with the server 102 and the mobile device 104 reversing roles. Moreover, both directions could be carried out to achieve a mutual authentication. Furthermore, the server 102 and the mobile device 104 may conduct another authentication process with respect to the asymmetric keypair D2B 226 and the data container 236. The trusted-authority root keys associated with the asymmetric keypair D2A 220 and the asymmetric keypair D2B 226 could be the same or different from one another. If different, the trusted-authority root keys could be from the same trusted authority or from different trusted authorities.

Figure 6:
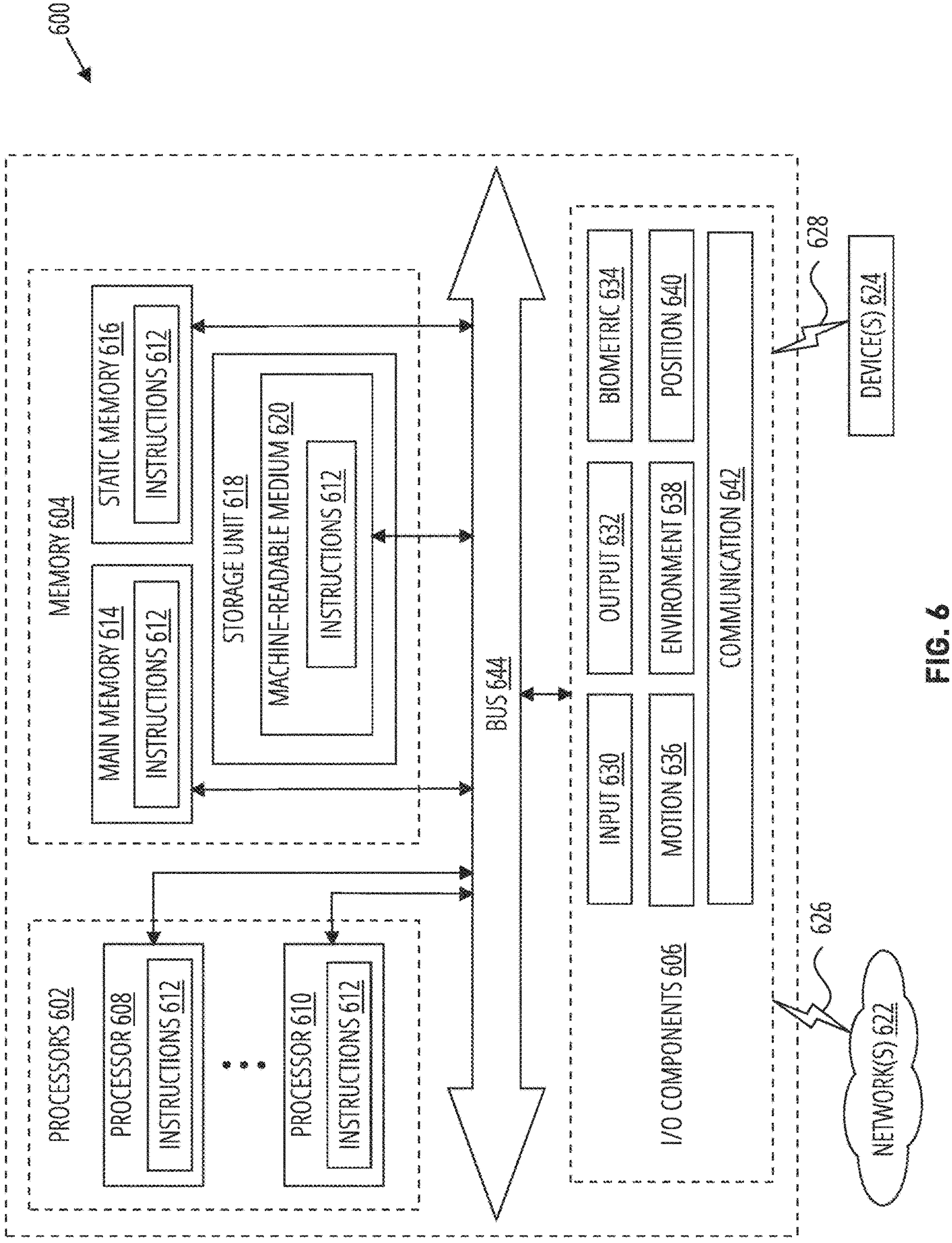
FIG. 6 depicts an example computer system that could be configured to perform at least one embodiment and/or embody one or more devices, systems, and/or the like, in accordance with at least one embodiment.

FIG. 6 depicts an example computer system 600 that could be utilized to embody and/or perform at least one embodiment, and within which instructions 612 (e.g., software, a program, an application, an applet, an app, and/or other executable code) may be executed to cause the computer system 600 to perform any one or more of the methodologies discussed herein. For example, execution of the instructions 612 may cause the computer system 600 to perform any one or more of the methods described herein. The instructions 612 transform the general, non-programmed computer system 600 into a particular computer system 600 programmed to carry out the described and illustrated functions in the manner described. The computer system 600 may operate as a standalone device or may be coupled (e.g., networked) to other machines. In a networked deployment, the computer system 600 may operate in the capacity of a server machine or a client machine in a server-client network environment, or as a peer machine in a peer-to-peer (or distributed) network environment.

The computer system 600 may be or include, but is limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 612, sequentially or otherwise, that specify actions to be taken by the computer system 600. Further, while only a single computer system 600 is illustrated, the term "machine" shall also be taken to include a collection of machines that individually or jointly execute the instructions 612 to perform any one or more of the methodologies discussed herein.

The computer system 600 may include processors 602, memory 604, and I/O components 606, which may be configured to communicate with each other via a bus 644. In an example embodiment, the processors 602 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 608 and a processor 610 that execute the instructions 612. The term "processor" is intended to include multi-core processors that may include two or more independent processors (sometimes referred to as "cores") that may execute instructions contemporaneously. Although FIG. 6 shows multiple processors 602, the computer system 600 may include a single processor with a single core, a single processor with multiple cores (e.g., a multi-core processor), multiple processors with a single core, multiple processors with multiples cores, or any combination thereof.

The memory 604 includes a main memory 614, a static memory 616, and a storage unit 618, each of which is accessible to the processors 602 via the bus 644. The memory 604, the static memory 616, and/or the storage unit 618 may store the instructions 612 executable for performing any one or more of the methodologies or functions described herein. The instructions 612 may also or instead reside completely or partially within the main memory 614, within the static memory 616, within machine-readable medium 620 within the storage unit 618, within at least one of the processors 602 (e.g., within a cache memory of a given one of the processors 602), and/or any suitable combination thereof, during execution thereof by the computer system 600. The machine-readable medium 620 is one or more non-transitory computer-readable storage media.

The I/O components 606 may include a wide variety of components to receive input, produce and/or provide output, transmit information, exchange information, capture measurements, and/or the like. The specific I/O components 606 that are included in a particular instance of the computer system 600 will depend on the type of machine. For example, portable machines such as mobile phones may include a touch input device or other such input mechanisms, while a headless server machine may not include such a touch input device. It will be appreciated that the I/O components 606 may include many other components that are not shown in FIG. 6.

In various example embodiments, the I/O components 606 may include output components 632 and input components 630. The output components 632 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 630 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 606 may include biometric components 634, motion components 636, environmental components 638, and/or position components 640, among a wide array of other components. The biometric components 634 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, and/or electroencephalogram-based identification), and/or the like. The motion components 636 may include acceleration-sensing components (e.g., an accelerometer), gravitation-sensing components, rotation-sensing components (e.g., a gyroscope), etc.

The environmental components 638 may include, for example, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors that detect nearby objects), gas-sensing components (e.g., gas-detection sensors to detection concentrations of hazardous gases for safety and/or to measure pollutants in the atmosphere), and/or other components that may provide indications, measurements, signals, and/or the like that correspond to a surrounding physical environment. The position components 640 may include location-sensing components (e.g., a global positioning system (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 606 may further include communication components 642 operable to communicatively couple the computer system 600 to a network 622 and/or devices 624 via a coupling 626 and/or a coupling 628, respectively. For example, the communication components 642 may include a network-interface component or another suitable device to interface with the network 622. In further examples, the communication components 642 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 624 may include one or more other machines and/or any of a wide variety of peripheral devices (e.g., a peripheral device coupled via a universal serial bus (USB) connection).

Moreover, the communication components 642 may detect identifiers or include components operable to detect identifiers. For example, the communication components 642 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 642, such as location via Internet Protocol (IP) geolocation, location via Wi-Fi signal triangulation, location via detecting an NFC beacon signal that may indicate a particular location, and/or the like.

One or more of the various memories (e.g., the memory 604, the main memory 614, the static memory 616, and/or the (e.g., cache) memory of one or more of the processors 602) and/or the storage unit 618 may store one or more sets of instructions (e.g., software) and/or data structures embodying or used by any one or more of the methodologies or functions described herein. These instructions (e.g., the instructions 612), when executed by one or more of the processors 602, cause various operations to implement various embodiments of the present disclosure.

The instructions 612 may be transmitted or received over the network 622, using a transmission medium, via a network-interface device (e.g., a network-interface component included in the communication components 642) and using any one of a number of well-known transfer protocols (e.g., the Session Initiation Protocol (SIP), the hypertext transfer protocol (HTTP), and/or the like). Similarly, the instructions 612 may be transmitted or received using a transmission medium via the coupling 628 (e.g., a peer-to-peer coupling) to the devices 624.

Figure 7:
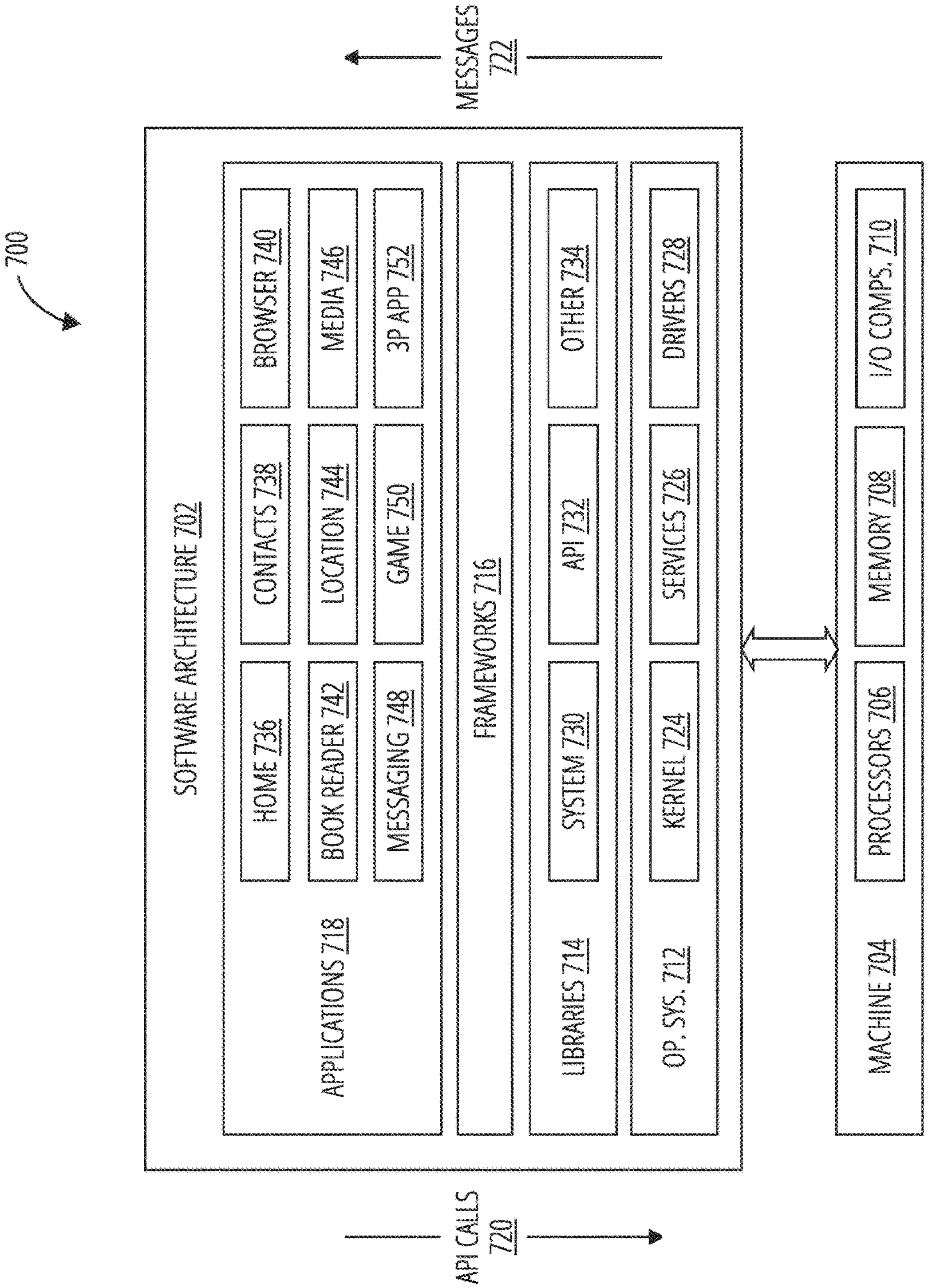
FIG. 7 depicts an example software architecture that could be implemented on a computer system such as the example computer system of FIG. 6, in accordance with at least one embodiment.

FIG. 7 depicts an example software architecture 702 that could be executed on the example computer system 600 of FIG. 6, in accordance with at least one embodiment. The illustrated example software architecture 702 can be installed on any one or more of the devices described herein. For example, the software architecture 702 could be installed on any device or system that is arranged similar to the computer system 600 of FIG. 6. The software architecture 702 is supported by hardware such as a machine 704 that includes processors 706, memory 708, and I/O components 710. In this example, the software architecture 702 can be conceptualized as a stack of layers, where each layer provides a particular functionality. The software architecture 702 includes layers such an operating system 712, libraries 714, frameworks 716, and applications 718. Operationally, using one or more application programming interfaces (APIs), the applications 718 invoke API calls 720 through the software stack and receive messages 722 in response to the API calls 720.

The operating system 712 manages hardware resources and provides common services. The operating system 712 includes, for example, a kernel 724, services 726, and drivers 728. The kernel 724 acts as an abstraction layer between the hardware and the other software layers. For example, the kernel 724 may provide memory management, processor management (e.g., scheduling), component management, networking, and/or security settings, in some cases among other functionality. The services 726 can provide other common services for the other software layers. The drivers 728 are responsible for controlling or interfacing with the underlying hardware. For instance, the drivers 728 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 714 provide a low-level common infrastructure used by the applications 718. The libraries 714 can include system libraries 730 (e.g., a C standard library) that provide functions such as memory-allocation functions, string-manipulation functions, mathematic functions, and/or the like. In addition, the libraries 714 can include API libraries 732 such as media libraries (e.g., libraries to support presentation and/or manipulation of various media formats such as Moving Picture Experts Group-4 (MPEG4). Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 714 can also include a wide variety of other libraries 734 to provide many other APIs to the applications 718.

The frameworks 716 may provide a high-level common infrastructure that is used by the applications 718. For example, the frameworks 716 may provide various graphical user interface (GUI) functions, high-level resource management, high-level location services, and/or the like. The frameworks 716 can provide a broad spectrum of other APIs that can be used by the applications 718, some of which may be specific to a particular operating system or platform.

Purely as representative examples, the applications 718 may include a home application 736, a contacts application 738, a browser application 740, a book-reader application 742, a location application 744, a media application 746, a messaging application 748, a game application 750, and/or a broad assortment of other applications generically represented in FIG. 7 as a third-party application 752. The applications 718 are programs that execute functions defined in the programs. Various programming languages can be employed to create one or more of the applications 718, structured in a variety of manners, such as object-oriented programming languages (e.g., Objective-C, Java, C++, etc.), procedural programming languages (e.g., C, assembly language, etc.), and/or the like. In a specific example, the third-party application 752 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 752 can invoke the API calls 720 provided by the operating system 712 to facilitate functionality described herein.

In view of the disclosure above, a listing of various examples of embodiments is set forth below. It should be noted that one or more features of an example, taken in isolation or combination, should be considered to be within the disclosure of this application.

Example 1 is a method performed by a first computing device executing instructions on at least one hardware processor, the method including: maintaining, in data storage, a first plurality of resource-specific asymmetric keypairs that are each uniquely associated with a different protected resource from among a second plurality of protected resources on the first computing device, a first resource-specific asymmetric keypair from among the first plurality being uniquely associated with a first protected resource from among the second plurality; engaging with a second computing device in a first authentication flow based on the first resource-specific asymmetric keypair; receiving, from the second computing device as part of the first authentication flow, a first public-key certificate that contains first target-binding data that indicates a first specified asymmetric keypair; checking whether the first specified asymmetric keypair matches the first resource-specific asymmetric keypair; and successfully authenticating the second computing device to the first resource-specific asymmetric keypair in response to each of one or more authentication conditions being met in connection with the first authentication flow, the one or more authentication conditions including the first specified asymmetric keypair matching the first resource-specific asymmetric keypair.

Example 2 is the method of Example 1, where the first protected resource includes a first set of one or more data-storage locations.

Example 3 is the method of Example 1 or Example 2, where the first protected resource includes a first set of one or more privileges.

Example 4 is the method of any of the Examples 1-3, where the first protected resource includes a first set of one or more applications installed on the first computing device.

Example 5 is the method of any of the Examples 1-4, where: a second resource-specific asymmetric keypair from among the first plurality is uniquely associated with a second protected resource from among the second plurality; and the method further includes: engaging with the second computing device in a second authentication flow based on the second resource-specific asymmetric keypair; receiving, from the second computing device as part of the second authentication flow, a second public-key certificate that contains second target-binding data that indicates a second specified asymmetric keypair; checking whether the second specified asymmetric keypair matches the second resource-specific asymmetric keypair; and successfully authenticating the second computing device to the second resource-specific asymmetric keypair in response to each of one or more authentication conditions being met in connection with the second authentication flow, the one or more authentication conditions including the second specified asymmetric keypair matching the second resource-specific asymmetric keypair.

Example 6 is the method of Example 5, where: the first public-key certificate includes a first cryptographic signature by a first trusted authority; the second public-key certificate includes a second cryptographic signature by the first trusted authority; and the method further includes: verifying the first cryptographic signature of the first public-key certificate using a first root key associated with the first trusted authority; and verifying the second cryptographic signature of the second public-key certificate using the first root key associated with the first trusted authority.

Example 7 is the method of Example 5, where: the first public-key certificate includes a first cryptographic signature by a first trusted authority; the second public-key certificate includes a second cryptographic signature by a second trusted authority; and the method further includes: verifying the first cryptographic signature of the first public-key certificate using a first root key associated with the first trusted authority; and verifying the second cryptographic signature of the second public-key certificate using a second root key associated with the second trusted authority.

Example 8 is the method of any of the Examples 1-7, where the first target-binding data indicates the first specified asymmetric keypair by a first unique identifier of the first specified resource-specific asymmetric keypair.

Example 9 is the method of any of the Examples 1-8, where the first target-binding data indicates the first specified asymmetric keypair by a first unique storage location of the first specified resource-specific asymmetric keypair on the first computing device.

Example 10 is the method of any of the Examples 1-9, where successfully authenticating the second computing device to the first resource-specific asymmetric keypair includes granting the second computing device access to the first protected resource.

Example 11 is a first computing device including: at least one hardware processor; and one or more non-transitory computer readable storage media containing instructions that, when executed by the at least one hardware processor, cause the first computing device to perform operations including: maintaining, in data storage, a first plurality of resource-specific asymmetric keypairs that are each uniquely associated with a different protected resource from among a second plurality of protected resources on the first computing device, a first resource-specific asymmetric keypair from among the first plurality being uniquely associated with a first protected resource from among the second plurality; engaging with a second computing device in a first authentication flow based on the first resource-specific asymmetric keypair; receiving, from the second computing device as part of the first authentication flow, a first public-key certificate that contains first target-binding data that indicates a first specified asymmetric keypair; checking whether the first specified asymmetric keypair matches the first resource-specific asymmetric keypair; and successfully authenticating the second computing device to the first resource-specific asymmetric keypair in response to each of one or more authentication conditions being met in connection with the first authentication flow, the one or more authentication conditions including the first specified asymmetric keypair matching the first resource-specific asymmetric keypair.

Example 12 is the first computing device of Example 11, where the first protected resource includes a first set of one or more data-storage locations.

Example 13 is the first computing device of Example 11 or Example 12, where the first protected resource includes a first set of one or more privileges.

Example 14 is the first computing device of any of the Examples 11-13, where the first protected resource includes a first set of one or more applications installed on the first computing device.

Example 15 is the first computing device of any of the Examples 11-14, where: a second resource-specific asymmetric keypair from among the first plurality is uniquely associated with a second protected resource from among the second plurality; and the operations further include: engaging with the second computing device in a second authentication flow based on the second resource-specific asymmetric keypair; receiving, from the second computing device as part of the second authentication flow, a second public-key certificate that contains second target-binding data that indicates a second specified asymmetric keypair; checking whether the second specified asymmetric keypair matches the second resource-specific asymmetric keypair; and successfully authenticating the second computing device to the second resource-specific asymmetric keypair in response to each of one or more authentication conditions being met in connection with the second authentication flow, the one or more authentication conditions including the second specified asymmetric keypair matching the second resource-specific asymmetric keypair.

Example 16 is the first computing device of Example 15, where: the first public-key certificate includes a first cryptographic signature by a first trusted authority; the second public-key certificate includes a second cryptographic signature by the first trusted authority; and the operations further include: verifying the first cryptographic signature of the first public-key certificate using a first root key associated with the first trusted authority; and verifying the second cryptographic signature of the second public-key certificate using the first root key associated with the first trusted authority.

Example 17 is the first computing device of Example 15, where: the first public-key certificate includes a first cryptographic signature by a first trusted authority; the second public-key certificate includes a second cryptographic signature by a second trusted authority; and the operations further include: verifying the first cryptographic signature of the first public-key certificate using a first root key associated with the first trusted authority; and verifying the second cryptographic signature of the second public-key certificate using a second root key associated with the second trusted authority.

Example 18 is the first computing device of any of the Examples 11-17, where the first target-binding data indicates the first specified asymmetric keypair by a first unique identifier of the first specified resource-specific asymmetric keypair.

Example 19 is the first computing device of any of the Examples 11-18, where the first target-binding data indicates the first specified asymmetric keypair by a first unique storage location of the first specified resource-specific asymmetric keypair on the first computing device.

Example 20 is the first computing device of any of the Examples 11-19, where successfully authenticating the second computing device to the first resource-specific asymmetric keypair includes granting the second computing device access to the first protected resource.

Example 21 is one or more non-transitory computer readable storage media containing instructions that, when executed by at least one hardware processor of a first computing device, cause the first computing device to perform operations including: maintaining, in data storage, a first plurality of resource-specific asymmetric keypairs that are each uniquely associated with a different protected resource from among a second plurality of protected resources on the first computing device, a first resource-specific asymmetric keypair from among the first plurality being uniquely associated with a first protected resource from among the second plurality; engaging with a second computing device in a first authentication flow based on the first resource-specific asymmetric keypair; receiving, from the second computing device as part of the first authentication flow, a first public-key certificate that contains first target-binding data that indicates a first specified asymmetric keypair; checking whether the first specified asymmetric keypair matches the first resource-specific asymmetric keypair; and successfully authenticating the second computing device to the first resource-specific asymmetric keypair in response to each of one or more authentication conditions being met in connection with the first authentication flow, the one or more authentication conditions including the first specified asymmetric keypair matching the first resource-specific asymmetric keypair.

Example 22 is the one or more non-transitory computer readable storage media of Example 21, where the first protected resource includes a first set of one or more data-storage locations.

Example 23 is the one or more non-transitory computer readable storage media of Example 21 or Example 22, where the first protected resource includes a first set of one or more privileges.

Example 24 is the one or more non-transitory computer readable storage media of any of the Examples 21-23, where the first protected resource includes a first set of one or more applications installed on the first computing device.

Example 25 is the one or more non-transitory computer readable storage media of any of the Examples 21-24, where: a second resource-specific asymmetric keypair from among the first plurality is uniquely associated with a second protected resource from among the second plurality; and the operations further include: engaging with the second computing device in a second authentication flow based on the second resource-specific asymmetric keypair; receiving, from the second computing device as part of the second authentication flow, a second public-key certificate that contains second target-binding data that indicates a second specified asymmetric keypair; checking whether the second specified asymmetric keypair matches the second resource-specific asymmetric keypair; and successfully authenticating the second computing device to the second resource-specific asymmetric keypair in response to each of one or more authentication conditions being met in connection with the second authentication flow, the one or more authentication conditions including the second specified asymmetric keypair matching the second resource-specific asymmetric keypair.

Example 26 is the one or more non-transitory computer readable storage media of Example 25, where: the first public-key certificate includes a first cryptographic signature by a first trusted authority; the second public-key certificate includes a second cryptographic signature by the first trusted authority; and the operations further include: verifying the first cryptographic signature of the first public-key certificate using a first root key associated with the first trusted authority; and verifying the second cryptographic signature of the second public-key certificate using the first root key associated with the first trusted authority.

Example 27 is the one or more non-transitory computer readable storage media of Example 25, where: the first public-key certificate includes a first cryptographic signature by a first trusted authority; the second public-key certificate includes a second cryptographic signature by a second trusted authority; and the operations further include: verifying the first cryptographic signature of the first public-key certificate using a first root key associated with the first trusted authority; and verifying the second cryptographic signature of the second public-key certificate using a second root key associated with the second trusted authority.

Example 28 is the one or more non-transitory computer readable storage media of any of the Examples 21-27, where the first target-binding data indicates the first specified asymmetric keypair by a first unique identifier of the first specified resource-specific asymmetric keypair.

Example 29 is the one or more non-transitory computer readable storage media of any of the Examples 21-28, where the first target-binding data indicates the first specified asymmetric keypair by a first unique storage location of the first specified resource-specific asymmetric keypair on the first computing device.

Example 30 is the one or more non-transitory computer readable storage media of any of the Examples 21-29, where successfully authenticating the second computing device to the first resource-specific asymmetric keypair includes granting the second computing device access to the first protected resource.

Furthermore, in this disclosure, in one or more embodiments, examples, and/or the like, it may be the case that one or more components of one or more devices, systems, and/or the like are referred to as modules that carry out (e.g., perform, execute, and the like) various functions. With respect to any such usages in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

In at least one embodiment, the instructions for a given module are executable by the hardware for carrying out the one or more herein-described functions of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium. A module could be realized as a single component or be distributed across multiple components. In some cases, a module may be referred to as a unit.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A method performed by a first computing device executing instructions on at least one hardware processor, the method comprising:

maintaining, in data storage, a first plurality of resource-specific asymmetric keypairs that are each uniquely associated with a different protected resource from among a second plurality of protected resources on the first computing device, a first resource-specific asymmetric keypair from among the first plurality being uniquely associated with a first protected resource from among the second plurality;

engaging with a second computing device in a first authentication flow based on the first resource-specific asymmetric keypair;

receiving, from the second computing device as part of the first authentication flow, a first public-key certificate that contains first target-binding data that indicates a first specified asymmetric keypair;

checking whether the first specified asymmetric keypair matches the first resource-specific asymmetric keypair; and successfully authenticating the second computing device to the first resource-specific asymmetric keypair in response to each of one or more authentication conditions being met in connection with the first authentication flow, the one or more authentication conditions comprising the first specified asymmetric keypair matching the first resource-specific asymmetric keypair.

2. The method of claim 1, wherein the first protected resource comprises a first set of one or more data-storage locations.

3. The method of claim 1, wherein the first protected resource comprises a first set of one or more privileges.

4. The method of claim 1, wherein the first protected resource comprises a first set of one or more applications installed on the first computing device.

5. The method of claim 1, wherein:

a second resource-specific asymmetric keypair from among the first plurality is uniquely associated with a second protected resource from among the second plurality; and the method further comprises:

engaging with the second computing device in a second authentication flow based on the second resource-specific asymmetric keypair;

receiving, from the second computing device as part of the second authentication flow, a second public-key certificate that contains second target-binding data that indicates a second specified asymmetric keypair;

checking whether the second specified asymmetric keypair matches the second resource-specific asymmetric keypair; and successfully authenticating the second computing device to the second resource-specific asymmetric keypair in response to each of one or more authentication conditions being met in connection with the second authentication flow, the one or more authentication conditions comprising the second specified asymmetric keypair matching the second resource-specific asymmetric keypair.

6. The method of claim 5, wherein:

the first public-key certificate comprises a first cryptographic signature by a first trusted authority:

the second public-key certificate comprises a second cryptographic signature by the first trusted authority; and the method further comprises:

verifying the first cryptographic signature of the first public-key certificate using a first root key associated with the first trusted authority; and verifying the second cryptographic signature of the second public-key certificate using the first root key associated with the first trusted authority.

7. The method of claim 5, wherein:

the first public-key certificate comprises a first cryptographic signature by a first trusted authority;

the second public-key certificate comprises a second cryptographic signature by a second trusted authority; and the method further comprises:

verifying the first cryptographic signature of the first public-key certificate using a first root key associated with the first trusted authority; and verifying the second cryptographic signature of the second public-key certificate using a second root key associated with the second trusted authority.

8. The method of claim 1, wherein the first target-binding data indicates the first specified asymmetric keypair by a first unique identifier of the first specified asymmetric keypair.

9. The method of claim 1, wherein the first target-binding data indicates the first specified asymmetric keypair by a first unique storage location of the first specified asymmetric keypair on the first computing device.

10. The method of claim 1, wherein successfully authenticating the second computing device to the first resource-specific asymmetric keypair comprises granting the second computing device access to the first protected resource.

11. A first computing device comprising:

at least one hardware processor; and one or more non-transitory computer readable storage media containing instructions that, when executed by the at least one hardware processor, cause the first computing device to perform operations comprising:

maintaining, in data storage, a first plurality of resource-specific asymmetric keypairs that are each uniquely associated with a different protected resource from among a second plurality of protected resources on the first computing device, a first resource-specific asymmetric keypair from among the first plurality being uniquely associated with a first protected resource from among the second plurality;

engaging with a second computing device in a first authentication flow based on the first resource-specific asymmetric keypair;

receiving, from the second computing device as part of the first authentication flow, a first public-key certificate that contains first target-binding data that indicates a first specified asymmetric keypair;

checking whether the first specified asymmetric keypair matches the first resource-specific asymmetric keypair; and successfully authenticating the second computing device to the first resource-specific asymmetric keypair in response to each of one or more authentication conditions being met in connection with the first authentication flow, the one or more authentication conditions comprising the first specified asymmetric keypair matching the first resource-specific asymmetric keypair.

12. The first computing device of claim 11, wherein the first protected resource comprises a first set of one or more data-storage locations.

13. The first computing device of claim 11, wherein the first protected resource comprises a first set of one or more privileges.

14. The first computing device of claim 11, wherein the first protected resource comprises a first set of one or more applications installed on the first computing device.

15. The first computing device of claim 11, wherein:

a second resource-specific asymmetric keypair from among the first plurality is uniquely associated with a second protected resource from among the second plurality; and the operations further comprise:

engaging with the second computing device in a second authentication flow based on the second resource-specific asymmetric keypair;

receiving, from the second computing device as part of the second authentication flow, a second public-key certificate that contains second target-binding data that indicates a second specified asymmetric keypair;

checking whether the second specified asymmetric keypair matches the second resource-specific asymmetric keypair; and successfully authenticating the second computing device to the second resource-specific asymmetric keypair in response to each of one or more authentication conditions being met in connection with the second authentication flow, the one or more authentication conditions comprising the second specified asymmetric keypair matching the second resource-specific asymmetric keypair.

16. The first computing device of claim 15, wherein:

the first public-key certificate comprises a first cryptographic signature by a first trusted authority;

the second public-key certificate comprises a second cryptographic signature by the first trusted authority; and the operations further comprise:

verifying the first cryptographic signature of the first public-key certificate using a first root key associated with the first trusted authority; and verifying the second cryptographic signature of the second public-key certificate using the first root key associated with the first trusted authority.

17. The first computing device of claim 15, wherein:

the first public-key certificate comprises a first cryptographic signature by a first trusted authority;

the second public-key certificate comprises a second cryptographic signature by a second trusted authority; and the operations further comprise:

verifying the first cryptographic signature of the first public-key certificate using a first root key associated with the first trusted authority; and verifying the second cryptographic signature of the second public-key certificate using a second root key associated with the second trusted authority.

18. The first computing device of claim 11, wherein the first target-binding data indicates the first specified resource-specific asymmetric keypair by a first unique identifier of the first specified resource-specific asymmetric keypair.

19. The first computing device of claim 11, wherein the first target-binding data indicates the first specified resource-specific asymmetric keypair by a first unique storage location of the first specified resource-specific asymmetric keypair on the first computing device.

20. The first computing device of claim 11, wherein successfully authenticating the second computing device to the first resource-specific asymmetric keypair comprises granting the second computing device access to the first protected resource.

21. One or more non-transitory computer readable storage media containing instructions that, when executed by at least one hardware processor of a first computing device, cause the first computing device to perform operations comprising:

maintaining, in data storage, a first plurality of resource-specific asymmetric keypairs that are each uniquely associated with a different protected resource from among a second plurality of protected resources on the first computing device, a first resource-specific asymmetric keypair from among the first plurality being uniquely associated with a first protected resource from among the second plurality;

engaging with a second computing device in a first authentication flow based on the first resource-specific asymmetric keypair;

receiving, from the second computing device as part of the first authentication flow, a first public-key certificate that contains first target-binding data that indicates a first specified asymmetric keypair;

checking whether the first specified asymmetric keypair matches the first resource-specific asymmetric keypair; and successfully authenticating the second computing device to the first resource-specific asymmetric keypair in response to each of one or more authentication conditions being met in connection with the first authentication flow, the one or more authentication conditions comprising the first specified asymmetric keypair matching the first resource-specific asymmetric keypair.

* * * * *